United States Patent [19]

Wagstaff et al.

[11] 4,171,180
[45] Oct. 16, 1979

[54] FAST ACTING CLUTCHING AND DE-CLUTCHING MECHANISM

[75] Inventors: Robert A. Wagstaff, New Holland; Bernard T. Jenny, Lancaster; Roger L. Risser, Leola, all of Pa.

[73] Assignee: Sperry Rand Corporation, New Holland, Pa.

[21] Appl. No.: 888,279

[22] Filed: Mar. 20, 1978

[51] Int. Cl.$^2$ .............................................. B60P 1/38
[52] U.S. Cl. ................................... 414/502; 192/101; 198/854; 414/518
[58] Field of Search .................. 214/83.14, 83.36, 519, 214/520, 521, 522; 198/854; 192/101; 414/502, 518

[56] References Cited

U.S. PATENT DOCUMENTS 2,541,515  2/1951  Hoffman et al. ..................... 192/101
3,275,176  9/1966  Kasten ........................... 198/854 X Primary Examiner—Robert G. Sheridan
Attorney, Agent, or Firm—John B. Mitchell; Frank A. Seemar; Ralph D'Alessandro

[57] ABSTRACT

A fast acting clutching and de-clutching mechanism in combination with a safety apparatus for a forage wagon is disclosed. Two interconnected alternative input drive shafts, one of the unloading from the front of the wagon and the other for the unloading to the rear thereof, are connected to the operable components of the wagon via a two-jaw clutch. Manually operated trip mechanisms adjacent the main openings in the wagon box are used to rapidly disengage the clutch jaws whenever sufficient contact is made therewith. A manual reset device is employed to engage the clutch jaws and reactivate the trip mechanisms.

7 Claims, 3 Drawing Figures

FAST ACTING CLUTCHING AND DE-CLUTCHING MECHANISM

BACKGROUND OF THE INVENTION

The conventional self-unloading wagon, commonly known as a forage wagon, is a versatile material handling implement adaptable to a number of farming operations requiring the moving and distribution of crops or other material. Such wagons include a box-like structure having a material supporting bed mounted on a mobile frame. An apron assembly is arranged along the bed to engage the material in the box and move it either forwardly or rearwardly of the wagon for eventual discharge therefrom. Mounted across the front end of the wagon is a powered cross conveyor which receives material fed to it by the moving apron assembly and discharges the material through an opening in the side of the box.

As is the case with many pieces of farm equipment, the moving parts thereof present a potential danger to the careless operator. The rotating beaters and/or moving cross conveyor could potentially injure an operator if he were to reach into the forward opening of the box or somehow cause hands or clothing to become entangled in the cross conveyor. Therefore, it would be advantageous to provide some type of safety stop apparatus adjacent the moving elements of the machine to provide a quick cutoff of power.

The invention to be described below is to such a safety device which readily prevents injury in the event that the operator places himself in a dangerous situation through carelessness or accident.

SUMMARY OF THE INVENTION

It is an object of the instant invention to provide a fast acting clutching and de-clutching mechanism for use in a forage wagon.

It is another object of the instant invention to provide a fast acting clutching and de-clutching mechanism which controls rotary power transfer to an output from either one of two alternative input drive shafts.

It is another object of the instant invention to provide a fast acting clutching and de-clutching mechanism for a forage wagon which is triggered into disengagement by a trip device located adjacent the operating elements of the wagon.

It is a further object of the instant invention to provide a fast acting clutching and de-clutching mechanism which is easily manually reset after disengagement.

It is a still further object of the instant invention to provide a fast acting clutching and de-clutching mechanism for a forage wagon which is triggered into disengagement by a safety trip device, and which may only be reset manually.

These and other objects are attained according to the instant invention by providing a fast acting clutching and de-clutching mechanism in combination with a safety apparatus for a forage wagon. Two interconnected alternative input drive shafts, one for the loading of the wagon and the other for the unloading thereof are connected to the operable components of the wagon via a two-jaw clutch. Manually operated trip mechanisms adjacent the main openings and operating elements of the wagon are used to quickly disengage the clutch jaws whenever sufficient contact is made therewith. A manual reset device is employed to engage the clutch jaws and reactivate the trip mechanisms.

BRIEF DESCRIPTION OF THE DRAWINGS

For a better understanding of the invention as well as other objects and further features thereof, reference is made to the following detailed disclosure of the preferred embodiment of the invention taken in conjunction with the accompanying drawings wherein.

DESCRIPTION OF THE PREFERRED EMBODIMENT

Figure 1:
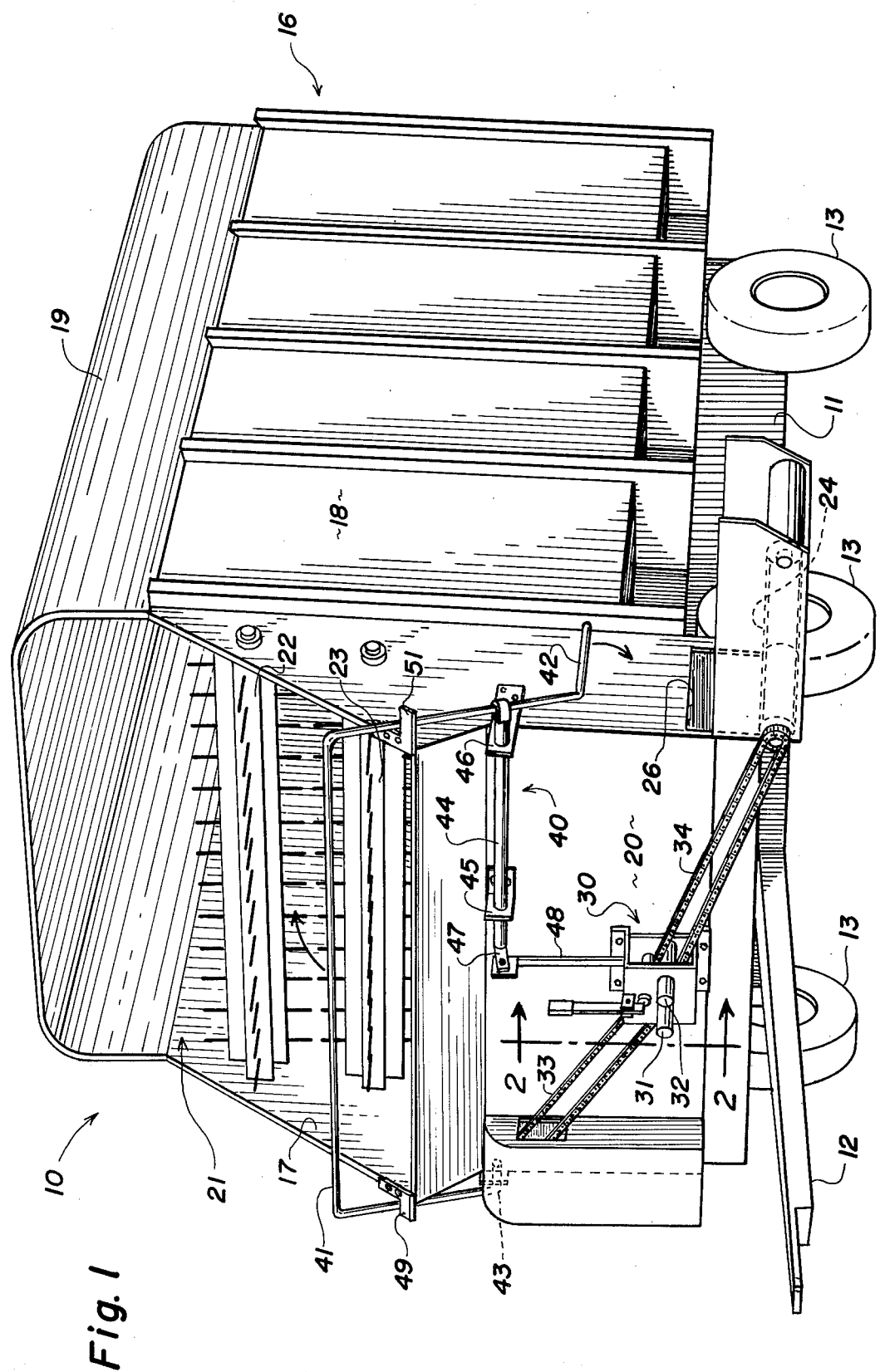
FIG. 1 is a left front perspective view of a forage wagon showing the instant invention affixed thereto.

Referring now to FIG. 1, it can be seen that the forage wagon 10 generally comprises a main frame 11 terminating forwardly in a tongue 12 for affixment to a tractor or another similar vehicle. The frame 11 is supported by wheels 13 for movement along the ground. A box 16 is comprised of lateral sides 17 and 18, a rear wall (not shown), a top 19 and a partial front wall 20. Box 16 is firmly affixed to main frame 11, and thus forms a unitary structure therewith. As is common in devices of this type, the box 16 terminates forwardly in a large opening 12 which is partially blocked by transverse rotatable beaters such as shown at 22 and 23. The forage wagon further includes a driven apron assembly (not shown) which traverses lengthwise the floor of the box to engage the material which is fed into the box and move it either forwardly or rearwardly depending upon the selective mode of operation. A cross conveyor extends transversely of the floor apron adjacent the forward wall of the box and is used to unload materials which have been moved forwardly by the floor apron. A cross conveyor extension 24 is shown to protrude through opening 26 in sidewall 18.

The clutching and de-clutching mechanism forming part of the instant invention is shown generally by the reference numeral 30 in FIG. 1. Two alternative input drive shafts 31 and 32 are shown in this figure as extending into the mechanism 30. Drive shaft 31 would be affixed to the power takeoff of the towing vehicle when operating in the forward unloading mode, while the drive shaft would be affixed to shaft 32 when unloading the materials out the rear. An output chain 33 extends from the mechanism 30 and, in known manner, is drivingly connected to the beaters 22 and 23 and the floor apron. Output chain 34 is affixed to the cross conveyor and extension 24 to apply power thereto.

A trip mechanism shown generally at 40 includes a safety shut-off bar 41 extending across opening 21 and terminating adjacent opening 26 with a bent handle 42. The right end of shut-off bar 41 is supported by a pivot means 43 and the left end is supported by rod 44. Rod 44 is pivotally supported for rotation at points 45 and 46. Rod 44 terminates inwardly at an arm 47 which is, in turn, pivotally connected to vertical trip arm 48. Trip arm 48 triggers clutching mechanism 30 in a manner to be described below. The shut-off bar 41 is maintained in its operational position by a pair of supports 49 and 51 which are affixed to the edge of sides 17 and 18, respectively.

Figure 2:
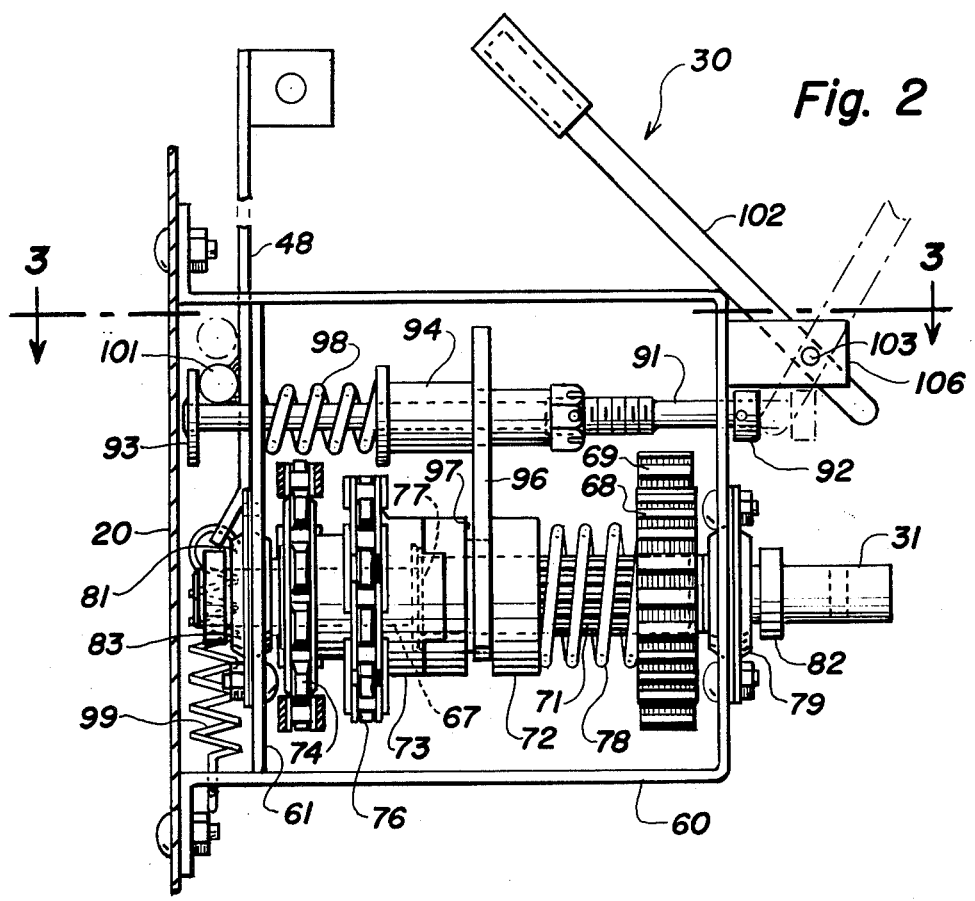
FIG. 2 is a side elevational view of the clutching and de-clutching mechanism of the instant invention taken along lines 2—2 of FIG. 1.
Figure 3:
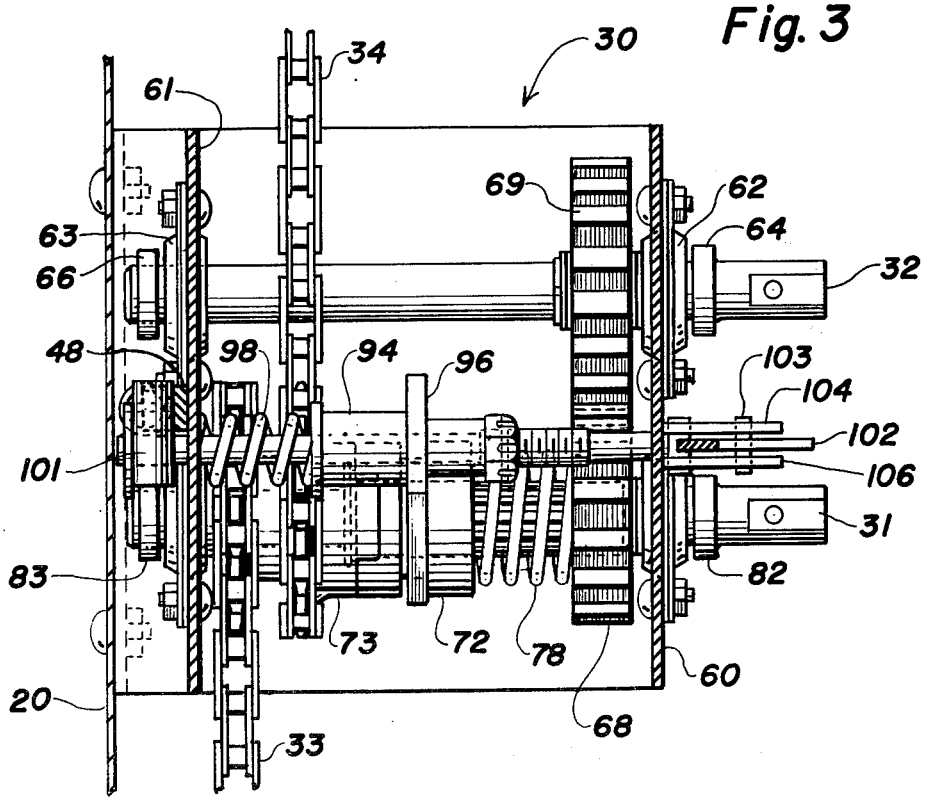
FIG. 3 is a top plan view of the clutching and de-clutching mechanism, taken along lines 3—3 of FIG. 2.

Referring now to FIGS. 2 and 3, the structure of the clutching and de-clutching mechanism 30 will be described in more detail. An external housing 60 including an inwardly spaced rear wall 61 is affixed to the forward wall 20 of the box 16 and supports the various working elements of the mechanism 30. Two input drive shafts 31 and 32 are provided for alternative connection to the p.t.o. of the prime mover for selective forward and reverse drive, respectively, of the various machine components. Shaft 32 is supported on housing 60 and rear wall 61 by bearings 62 and 63 and held in place relative thereto by collars 64 and 66.

Input shaft 31, as can perhaps best be seen in FIG. 2, is in axial alignment with stub shaft 67 and in substantial abutment therewith. A pair of mating spur gears 68 and 69 are affixed respectively to shafts 31 and 32, and form a continuous rotating relationship therebetween. The inward end portion, except for a small section of the very end, of shaft 31 is splined, as shown in 71, and has a clutch jaw 72 movably positioned thereon. Stub shaft 67 has a clutch jaw 73 fixed thereon which includes fixed chain sprockets 74 and 76 for support of chains 33 and 34, respectively. The inward end of shaft 31 terminates in a recess 77 in clutch jaw 73 and is supported thereby and freely rotatable therein. A spring 78 biases clutch jaw 72 toward engagement with clutch jaw 73. Shafts 31 and 67 are further rotatably supported by bearings 79 and 81, respectively, and held in position by collars 82 and 83.

A trigger means for engaging or disengaging clutch jaws 72 and 73 is shown to include an adjustable length pin 91 held in position relative to housing 60 and rear wall 61 by endcaps 92 and 93. A sleeve 94 fits onto pin 91 and includes a depending fork 96 which engages an annular recess 97 in clutch jaw 72. Clutch 72 is free to rotate within the fingers of fork 96, yet moves laterally therewith because of the interference between the fork and recess 97. Spring 98 biases sleeve 94, and thus fork 96 and clutch jaw 72, to the right, or disengagement position. The strength of spring 98 is great enough to overcome that of spring 78 and the frictional sliding forces between clutch jaw 72 and shaft 31. Vertical trip arm 48 is biased downwardly by spring 99 so that short horizontal trip rod 101, which is affixed thereto, spaces the endcap 93 away from rear wall 61.

Manual lever 102 is pivotally affixed at 103 between ears 104 and 106 to engage endcap 92 and selectively axially move pin 91.

In operation, the clutching and de-clutching mechanism 30 will be in the position shown in solid line in FIG. 2. Vertical trip arm 48 will be in its lowermost position, trip rod 101 will be holding endcap 93 and pin 91 in the leftmost position, and fork 96 will be holding the clutch jaws 72 and 73 in engagement. If the safety bar 41 or handle 42 are activated, vertical trip arm 48 will move upwardly, thus moving trip rod 101 to the dotted line position shown in FIG. 2. Spring 98 will then be free to act upon sleeve 94 to move pin 91 to the dotted line position, and simultaneously move clutch jaw 72 out of engagement with clutch jaw 73. Shaft 31 will then be rotating freely and not transmitting power to the sprockets 74 and 76. To reactivate the system, manual lever 102 is pulled and the pin 91 is moved to the left so that trip rod 101 may fall into the solid line position. The mechanism is then again ready for operation.

It will be understood that various other changes in the details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention.

For example, the fast acting clutching and de-clutching mechanism described above has been shown to be useful in conjunction with forage wagons; however, this apparatus would, in fact, be applicable to any machine requiring a small, compact apparatus of this nature.

Having thus described the invention, what is claimed is:

1. A fast acting clutching and de-clutching mechanism comprising:
    (a) first and second alternative substantially parallel input drive shafts drivingly coupled together by intermeshing gear means such that rotation of one causes an opposite rotation of the other;
    (b) power output means affixed to said second drive shaft;
    (c) first and second engageable clutch jaws affixed respectively to said second drive shaft and said power output means;
    (d) a movable control mechanism connected to said first clutch jaw to move it into and out of engagement with said second clutch jaw, said movable control mechanism including an elongate axially movable pin having an axis substantially parallel to the axes of said first and second drive shafts and an arm fixed to said pin and extending laterally toward said first clutch jaw and at least partially surrounding and engaging same whereby said clutch jaw may rotate relative to said arm, yet moves axially therewith into and out of engagement with said second clutch jaw;
    (e) first biasing means urging said pin in a direction to move said first clutch jaw out of engagement with said second clutch jaw; and
    (f) trigger means movable between a first position in engagement with said pin wherein said first clutch jaw is in engagement with said second clutch jaw and against the urging of said biasing means and a second position out of engagement therewith allowing said pin to move said first clutch jaw out of engagement with said second clutch jaw.

2. The mechanism of claim 1 further including second biasing means urging said first clutch jaw toward engagement with said second clutch jaw.

3. The mechanism of claim 2 further including manual reset means movable to selectively contact said pin and move it axially against the force of said first biasing means.

4. In a forage wagon including a box with a forwardly directed opening, a plurality of beaters mounted across said opening, a floor apron, a cross conveyor adjacent said floor apron and running to a side opening in said box, and a drive transfer mechanism for transmitting rotary input power to said beaters, apron and conveyor, the improvement in said drive transfer mechanism comprising:
    (a) first and second alternative input drive shafts drivingly coupled together by intermeshing gear means such that rotation of one causes an opposite rotation of the other;
    (b) power output means affixed to said second drive shaft and connected to said beaters, apron and conveyor;

(c) first and second engageable clutch jaws affixed respectively to said second drive shaft and said power output means;
(d) a movable control mechanism connected to said first clutch jaw to move it into and out of engagement with said second clutch jaw, said movable control mechanism including an elongate axially movable pin having an axis substantially parallel to the axes of said first and second drive shafts and an arm fixed to said pin and extending laterally toward said first clutch jaw and at least partially surrounding and engaging same whereby said clutch jaw may rotate relative to said arm, yet moves axially therewith into and out of engagement with said second clutch jaw;
(e) first biasing means urging said pin in a direction to move said first clutch jaw out of engagement with said second clutch jaw;
(f) trigger means movable between a first position in engagement with said pin wherein said first clutch jaw is in engagement with said second clutch jaw and against the urging of said biasing means and a second position out of engagement therewith allowing said pin to move said first clutch jaw out of engagement with said second clutch jaw; and
(g) trip means extending across said opening and affixed to said trigger means whereby movement of said trip means causes said trigger means to move to said second position thereto.

5. The forage wagon of claim 4 further including second biasing means urging said first clutch jaw toward engagement with said second clutch jaw.

6. The forage wagon of claim 5 further including manual reset means movable to selectively contact said pin and move it axially against the force of said first biasing means.

7. The forage wagon of claim 6 wherein said trip means further includes a manually operable lever adjacent said side opening in said box.

* * * * *